(12) United States Patent
Stamey, Jr. et al.

(10) Patent No.: US 12,036,494 B2
(45) Date of Patent: *Jul. 16, 2024

(54) FILTER ASSEMBLY

(71) Applicant: MANN+HUMMEL Filtration Technology US LLC, Gastonia, NC (US)

(72) Inventors: Willie L Stamey, Jr., Kings Mountain, NC (US); Dillan Scott Shaffer, Charlotte, NC (US); Antonio Jose Gonzalez Arevalo, Cramerton, NC (US)

(73) Assignee: MANN+HUMMEL Filtration Technology US LLC, Gastonia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,336

(22) Filed: Jul. 31, 2023

(65) Prior Publication Data
US 2023/0372846 A1 Nov. 23, 2023

Related U.S. Application Data (63) Continuation of application No. 17/506,976, filed on Oct. 21, 2021, now Pat. No. 11,752,458, which is a
(Continued)

(51) Int. Cl.
*B01D 35/34* (2006.01)
*B01D 24/46* (2006.01)

(52) U.S. Cl.
CPC ......... *B01D 35/34* (2013.01); *B01D 24/4631* (2013.01); *B01D 2201/304* (2013.01); *B01D 2201/342* (2013.01)

(58) Field of Classification Search
CPC ............... B01D 35/34; B01D 24/4631; B01D 2201/304; B01D 2201/342;
(Continued)

(56) References Cited

U.S. PATENT DOCUMENTS 6,190,432 B1 2/2001 Gieseke et al.
6,261,334 B1 7/2001 Morgan et al.
(Continued)

FOREIGN PATENT DOCUMENTS

| CN | 1935314 A | 3/2007 |
| CN | 102316958 A | 1/2012 |

(Continued)

OTHER PUBLICATIONS

Chinese Patent Office, Notice of Allowance for Application No. 202180017919..X dated Nov. 5, 2023.
(Continued)

*Primary Examiner* — Waqaas Ali
(74) *Attorney, Agent, or Firm* — Honigman LLP (57) ABSTRACT

A filter assembly includes a body of filter media, a seal, and a compression ring. The body of filter media having a first end surface, a second end surface spaced apart from and opposing the first end surface, and an outer surface extending between the first end surface and the second end surface. The seal surrounds the first end surface. The compression ring is disposed about the second end surface. The compression ring includes a first channel configured to allow fluid communication between the second end surface and the outer surface.

16 Claims, 4 Drawing Sheets

Related U.S. Application Data continuation of application No. 16/806,159, filed on Mar. 2, 2020, now Pat. No. 11,161,068.

(58) Field of Classification Search
CPC .......... B01D 2265/028; B01D 2265/04; B01D 46/527; B01D 46/0005; B01D 2271/02
See application file for complete search history.

(56) References Cited

U.S. PATENT DOCUMENTS

| | | | |
|---|---|---|---|
| 6,517,598 | B2 | 2/2003 | Anderson et al. |
| 6,610,126 | B2 | 8/2003 | Xu et al. |
| 6,878,190 | B1 | 4/2005 | Xu et al. |
| 6,997,968 | B2 | 2/2006 | Xu et al. |
| 7,393,375 | B2 | 7/2008 | Xu et al. |
| 7,628,837 | B2 | 12/2009 | Ehrenberg |
| 7,691,166 | B2 | 4/2010 | Xu et al. |
| 7,976,601 | B2 | 7/2011 | Xu et al. |
| 8,246,707 | B2 | 8/2012 | Xu et al. |
| 8,323,384 | B2 | 12/2012 | Derstler et al. |
| 8,608,818 | B2 | 12/2013 | Xu et al. |
| 8,652,228 | B2 | 2/2014 | Krisko et al. |
| 9,346,004 | B2 | 5/2016 | Xu et al. |
| 9,358,489 | B2 | 6/2016 | Kaufmann et al. |
| 10,500,533 | B2 | 12/2019 | Krisko et al. |
| 2002/0073665 | A1 | 6/2002 | Gieseke et al. |
| 2006/0091064 | A1 | 5/2006 | Brown et al. |
| 2012/0159915 | A1 | 6/2012 | Heckel et al. |
| 2015/0292448 | A1* | 10/2015 | Campbell ........ F02M 35/02416 55/502 |
| 2016/0256813 | A1 | 9/2016 | Dworatzek et al. |
| 2016/0279543 | A1 | 9/2016 | Stamey, Jr. et al. |
| 2018/0200651 | A1 | 7/2018 | Harrelson |

FOREIGN PATENT DOCUMENTS

| | | |
|---|---|---|
| CN | 103816746 A | 5/2014 |
| CN | 106948983 A | 7/2017 |
| EP | 2318114 B1 | 3/2013 |
| JP | H09028986 A | 2/1997 |
| JP | 2002542417 A | 12/2002 |
| JP | 2003-320202 A | 11/2003 |
| JP | 2010012460 A | 1/2010 |
| JP | 2015081521 A | 4/2015 |
| WO | 2014210541 A1 | 12/2014 |

OTHER PUBLICATIONS

Japanese Patent Office, Office Action for Application No. 2022-552876 dated Oct. 10, 2023.
Non-Final Office Action dated Mar. 26, 2021, relating to U.S. Appl. No. 16/806,159.
International Preliminary Report on Patentability and Written Opinion for Application PCT/US2021/020240 dated Sep. 15, 2022.
International Search Report for Application PCT/US2021/020240 dated Jun. 21, 2021.
Chinese Patent Office, First Office Action for Application 202180017919.X dated May 6, 2023.
Non-Final Office Action dated Oct. 14, 2022, relating to U.S. Appl. No. 17/506,976.
Japanese Patent Office, Office Action for Application No. 2022-552876 dated May 1, 2024.

* cited by examiner

FILTER ASSEMBLY

CROSS REFERENCE TO RELATED APPLICATION

This U.S. patent application is a continuation of and claims priority under 35 U.S.C. § 120 from U.S. patent application Ser. No. 17/506,976, filed on Oct. 21, 2021, which is a continuation of and claims priority under 35 U.S.C. § 120 from U.S. patent application Ser. No. 16/806,159, filed on Mar. 2, 2020, now issued as U.S. Pat. No. 11,161,068. The disclosure of the prior application is considered part of the disclosure of this application and is hereby incorporated by reference in its entirety.

FIELD

The present disclosure relates generally to a filter assembly and more particularly to a filter assembly having a seal and a compression ring.

BACKGROUND

This section provides background information related to the present disclosure and is not necessarily prior art.

Various filter assemblies are known in the art for filtering fluid, such as air, as it travels along a fluid path. Such filters include filter media which removes impurities from the fluid. In most applications, either the filter assembly or the filter media associated therewith must be periodically replaced to reduce the potential for developing unacceptably high impedance in the fluid flow path.

While known filter assemblies have proven to be acceptable for various applications, such conventional filter assemblies are nevertheless susceptible to improvements that may enhance their overall performance and cost. Therefore, a need exists to develop an improved filter assembly and methodologies for forming the same that advance the art.

SUMMARY

This section provides a general summary of the disclosure, and is not a comprehensive disclosure of its full scope or all of its features.

One aspect of the disclosure provides a filter assembly. The filter assembly may include a body of filter media, a seal, and a compression ring. The body of filter media may include a first end surface, a second end surface spaced apart from and opposing the first end surface, and an outer surface extending between the first end surface and the second end surface. The seal may surround the first end surface. The compression ring may be disposed about the second end surface. The compression ring may include a first channel configured to allow fluid communication between the second end surface and the outer surface.

Implementations of the disclosure may include one or more of the following optional features. In some implementations, the compression ring includes an end surface and a side surface extending from the end surface. The first channel may be disposed in the end surface and the side surface.

In some implementations, the end surface extends radially and the side surface extends axially.

In some implementations, the compression ring further includes a second channel, a third channel, and a fourth channel.

In some implementations, each of the second channel, the third channel, and the fourth channel are disposed in the end surface and the side surface of the compression ring.

In some implementations, the first channel, the second channel, the third channel, and the fourth channel are evenly spaced about the second end surface of the filter media.

In some implementations, the filter media is substantially cylindrical.

In some implementations, the filter assembly includes a screen element. The screen element may have a first end surface and a second end surface spaced apart from and opposing the first end surface. The second end surface of the screen element may be disposed adjacent to the first end surface of the filter media.

In some implementations, the screen element includes a substantially disc-shaped base portion and an outer flange portion.

In some implementations, the body of filter media further defines a ledge disposed proximate the first end surface of the body of filter media. The seal may be disposed upon the ledge. The seal may surround a portion of the screen element.

Another aspect of the disclosure provides a filter assembly. The filter assembly may include a body of filter media, a seal member, and a compression ring. The body of filter media may include an inlet end, an outlet end spaced apart from and opposing the inlet end, and a sidewall extending between the inlet end and the outlet end. The seal member may extend around the body. The seal member may include a first radially-extending surface. The outlet end may be disposed between the first radially-extending surface and the inlet end. The compression ring may extend around the body. The compression ring may include a second radially-extending surface defining a first channel extending between the inlet end and the sidewall. The inlet end may be disposed between the second radially-extending surface and the outlet end.

Implementations of this aspect of the disclosure may include one or more of the following optional features. In some implementations, the compression ring further includes an axially-extending surface. The first channel may be disposed in the second radially-extending surface and the axially-extending surface.

In some implementations, the second radially-extending surface of the compression ring further defines a second channel, a third channel, and a fourth channel.

In some implementations, each of the second channel, the third channel, and the fourth channel is disposed in the second radially-extending surface and the axially-extending surface of the compression ring.

In some implementations, the first channel, the second channel, the third channel, and the fourth channel are evenly spaced about the body of filter media.

In some implementations, the filter media is substantially cylindrical.

In some implementation, the filter assembly further includes a screen element. The screen element may have a first end surface and a second end surface spaced apart from and opposing the first end surface. The second end surface may be disposed adjacent to the outlet end of the filter media.

In some implementations, the screen element includes a substantially disc-shaped base portion and an outer flange.

In some implementations, the body of filter media further defines a ledge disposed proximate the outlet end.

In some implementations, the seal member is disposed upon the ledge. The seal member may surround at least a portion of the screen element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 1:
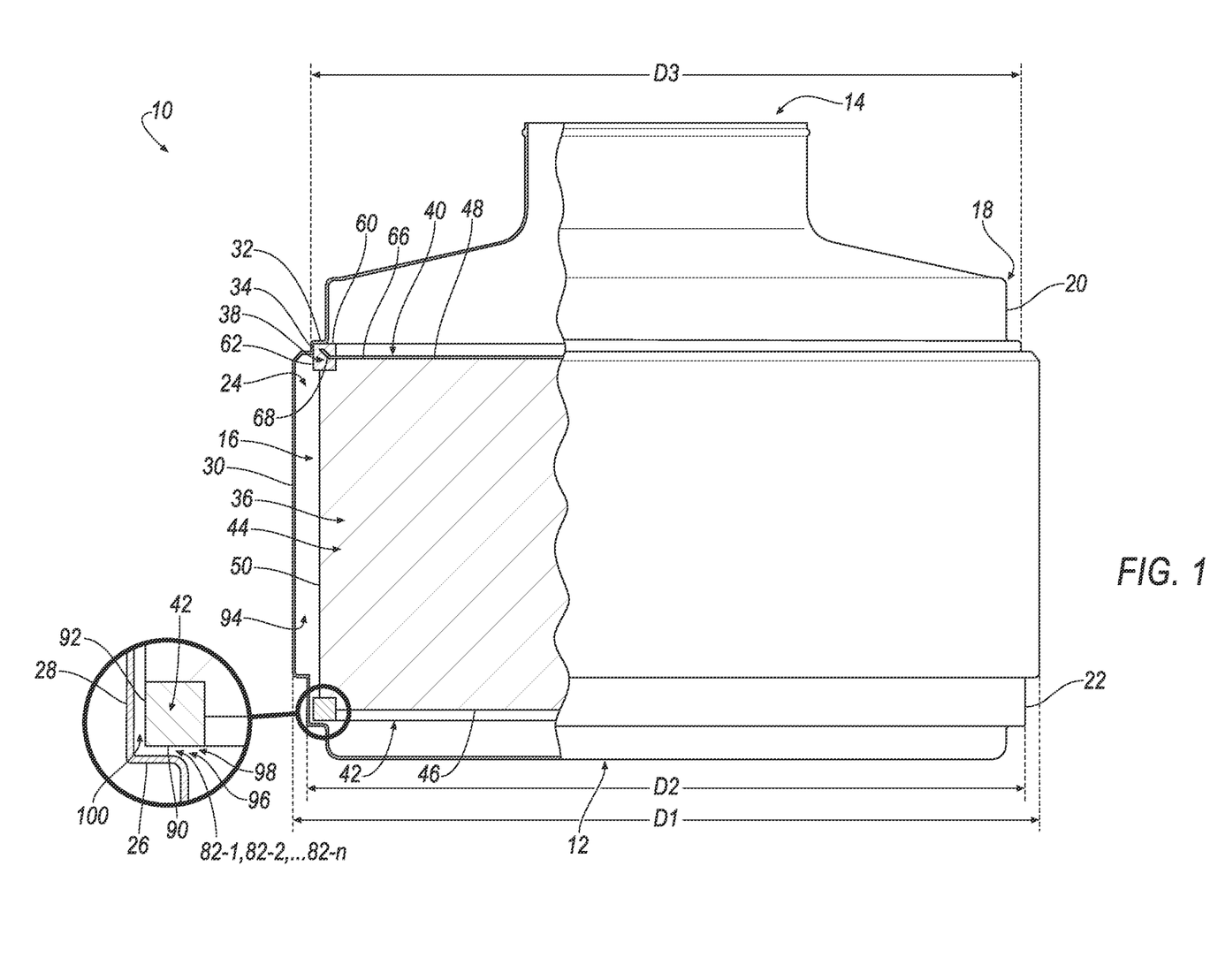
FIG. 1 is a schematic view of a filter assembly in accordance with the principles of the present disclosure, a portion of the housing removed for illustration purposes.

With reference to FIG. 1, a filter assembly 10 is shown. As will be explained in more detail below, the filter assembly 10 may be used for removing impurities and/or particulates from a fluid passing therethrough. For example, the filter assembly 10 may be used in a vehicle (not shown), such as an automobile or commercial equipment, to remove impurities from air passing between the environment and an engine or motor of the vehicle. In this regard, the filter assembly 10 may include an inlet end 12 and an outlet end 14. The fluid containing the particulates may enter the filter assembly 10 at the inlet end 12, and clean air (e.g., air without the particulates) may exit the filter assembly 10 at the outlet end 14.

The filter assembly 10 may include a filter element 16 and a housing 18. As illustrated in FIG. 1, the filter element 16 may be disposed within the housing 18. In some configurations, the housing 18 includes a body portion 20 and a cover 22. In an assembled configuration, the cover 22 may be removably coupled to the body portion 20 to define a chamber 24. In this regard, the cover 22 may be removed from the body portion 20 to provide access to the chamber 24 and the filter element 16 disposed therein.

The cover 22 may include a first support wall 26, a second support wall 28, and an outer wall 30. The first and second support walls 26, 28 may be disposed proximate the inlet end 12. In some implementations, at least a portion (e.g., an inner surface) of the first support wall 26 extends in a radial direction, while at least a portion (e.g., an inner surface) of the second support wall 28 and at least a portion (e.g., an inner surface) of the outer wall 30 extends in an axial direction. In this regard, the inner surface of the outer wall 30 may define a first diameter D1, while the inner surface of the second support wall 28 may define a second diameter D2 that is less than the first diameter D1.

The body portion 20 may include a third support wall 32 and a fourth support wall 34. The third and fourth support walls 32, 34 may be disposed proximate the outlet end 14. In some implementations, at least a portion (e.g., an inner surface) of the third support wall 32 extends in a radial direction, while at least a portion (e.g., an inner surface) of the fourth support wall 34 extends in an axial direction. The inner surface of the fourth support wall 34 may define a third diameter D3 that is substantially similar (e.g., equal to) to the second diameter D2.

As will be explained in more detail below, in the assembled configuration, the filter element 16 may be disposed within the chamber 24 such that one or both of the first and second support walls 26, 28 engage a first end of the filter element 16, while one or both of the third and fourth support walls 32, 34 engage a second end of the filter element 16, to secure the filter element 16 between the body portion 20 and the cover 22 within the chamber 24.

With reference to FIGS. 1-4, the filter element 16 may include a filter media 36, a seal member 38, a screen element 40, a compression ring 42, and a plug 43. In some implementations, the filter media 36 includes a fluted sheet secured to a flat sheet. The fluted sheet may include a corrugated layer secured to the flat sheet via an adhesive. The corrugated layer may include straight flutes, whereby the flutes are parallel to one another. The straight flutes may include crushed ends or pinched ends. In some implementations, the corrugated layer includes tapered flutes, whereby alternating flutes gradually converge from a wide section to a narrow section with the subsequent adjacent flute diverging from a narrow section to a wide section. While the filter media 36 is generally shown and described herein as defining a fluted sheet secured to a flat sheet, it will be appreciated that the filter media 36 may take other forms (e.g., pleated filter media) within the scope of the present disclosure.

In some implementations, the filter media 36 is wrapped in a coiled configuration. For example, the filter media 36 may be wrapped to define a substantially cylindrical shape. In other implementations, the filter media 36 may be wrapped to define other shapes (e.g., oval, oblong, rectangular, etc.). In some configurations, the filter media 36 is coreless, whereby the filter media (e.g., the fluted sheets and the flat sheets) are disposed only around one each other or a hollow, and are not around a central core member or other structure.

Figure 4:
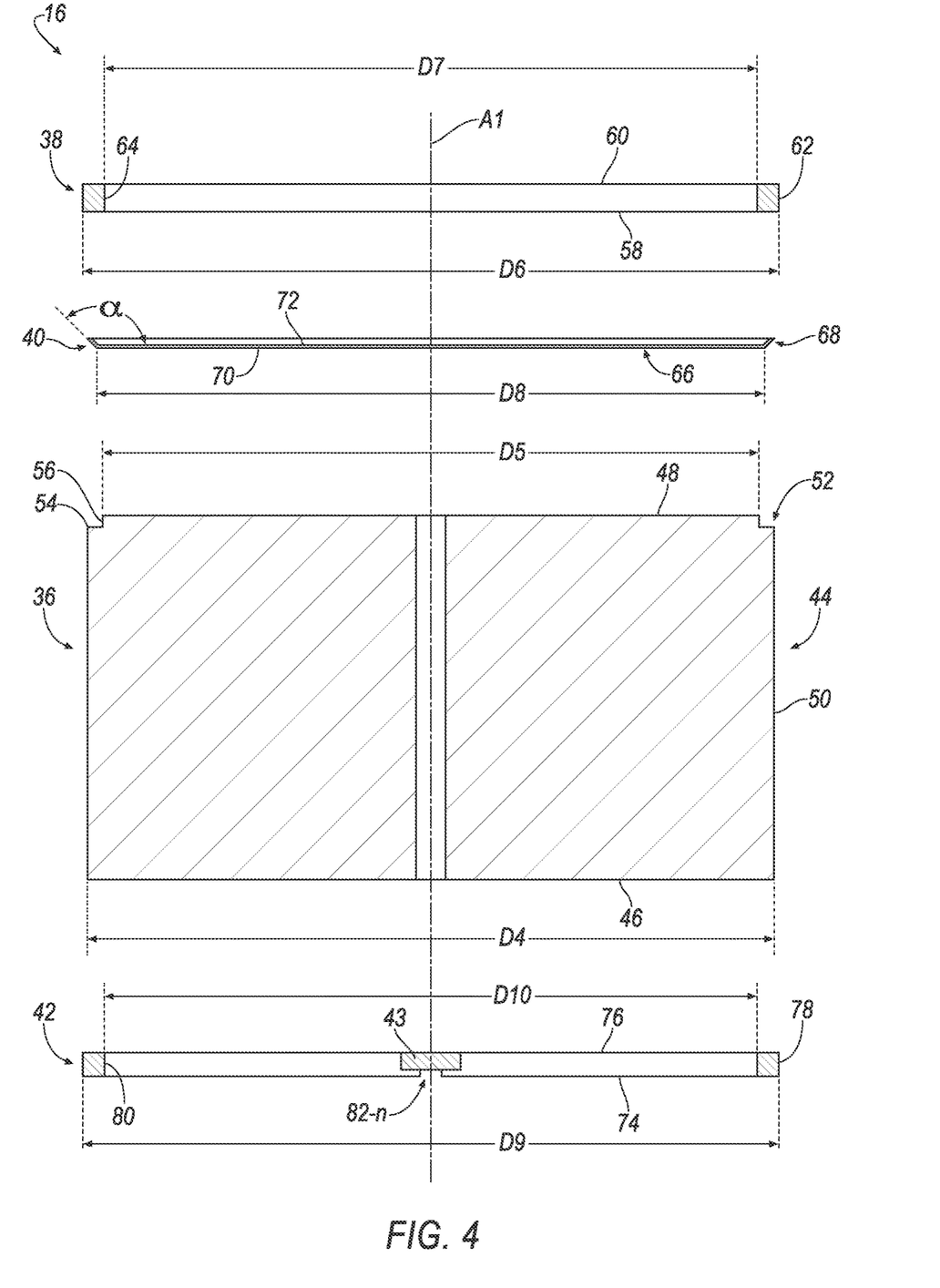
FIG. 4 is an exploded cross-sectional view of the filter of FIG. 3 taken along the line 4-4.

As illustrated in FIG. 4, the filter media 36 may extend along a longitudinal axis A1 and include a body 44 having a first end 46 and a second end 48 spaced apart from and opposing the first end 46. With reference to FIG. 1, in the assembled configuration, the first end 46 may be disposed proximate the inlet end 12 of the filter assembly 10. The second end 48 may be disposed proximate the outlet end 14 of the filter assembly 10. In this regard, as will be explained in more detail below, the first end 46 may correspond to an inlet for the flow of fluid through the filter media 36 and the filter assembly 10, while the second end 48 may correspond to an outlet for the flow of fluid through the filter media 36 and the filter assembly 10.

As illustrated in FIG. 4, the body 44 may include a outer side surface 50 extending between the first end 46 and the second end 48. The outer side surface 50 may define a fourth diameter D4. The fourth diameter D4 may be less than the second diameter D2. In some configurations, the body 44 includes a ledge 52 disposed proximate the outlet end 14 of the filter assembly 10. In some implementations, the ledge 52 is formed by cutting the body 44 of the filter media 36. For example, the ledge 52 may be formed by cutting a channel into the outer side surface 50 and the second end 48. In other implementations, the ledge 52 may be formed by wrapping the filter media 36 at varying positions along the longitudinal axis A1.

The ledge 52 may define or otherwise include a top surface 54 and a side surface 56. The top surface 54 may be disposed between the first and second ends 46, 48. In some implementations, the top surface 54 extends in a radial direction. The side surface 56 extends from the top surface 54 and be disposed between the longitudinal axis A1 and the outer side surface 50. In this regard, the side surface 56 may extend in an axial direction. The side surface 56 may define a fifth diameter that is less than the fourth diameter D4.

Figure 3:
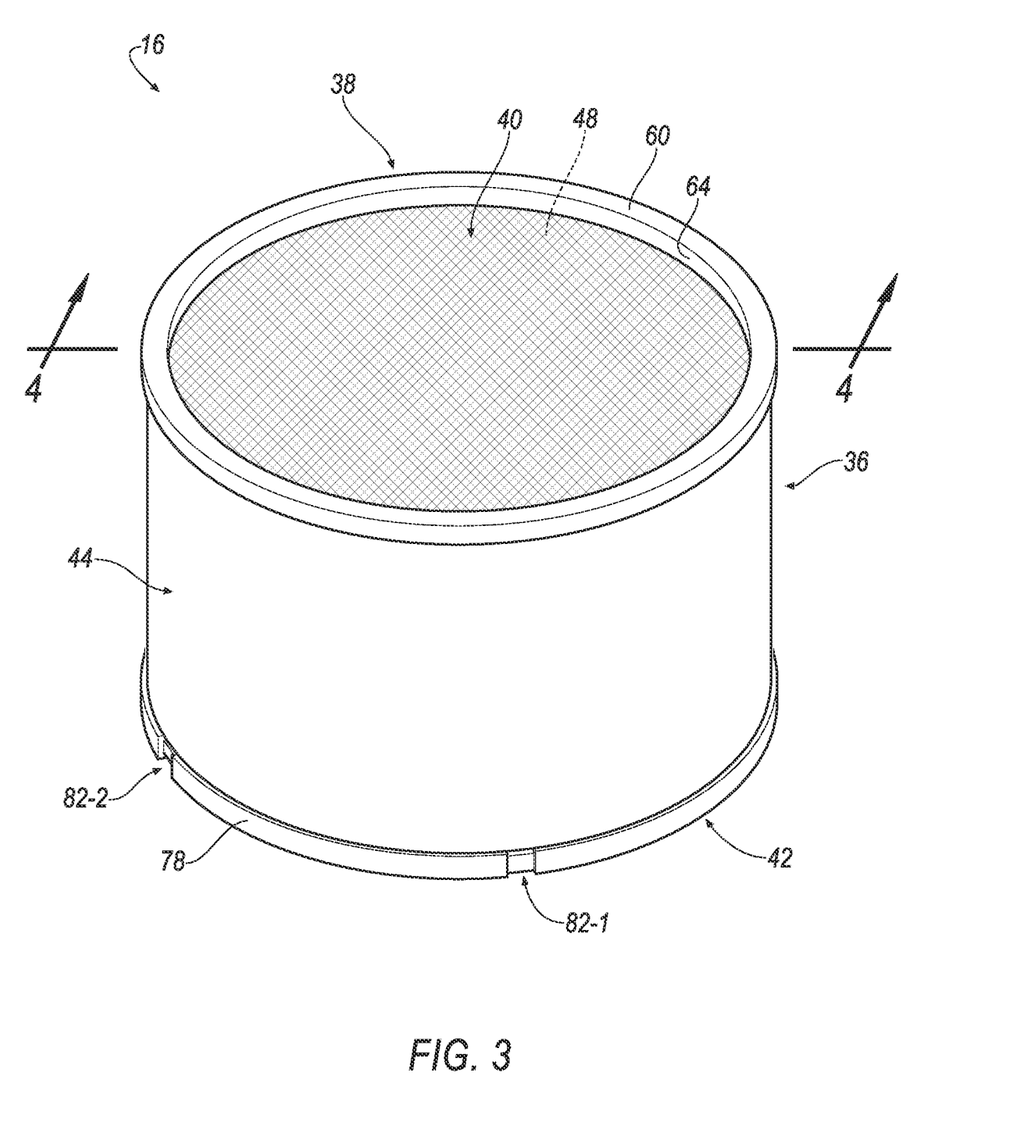
FIG. 3 is a bottom perspective view of the filter element of FIG. 2.

With reference to FIGS. 1, 3, and 4, the seal member 38 may include a first end surface 58, a second end surface 60, an outer side surface 62, and an inner side surface 64. The second end surface 60 may be spaced apart from and opposing the first end surface 58. In some implementations, the first and second end surfaces 58, 60 extend in a radial direction relative to the axis A1. The outer side surface 62 may extend between the first end surface 58 and the second end surface 60. In some implementations, the outer side surface 62 extends in an axial direction. In this regard, the outer side surface 62 may define a sixth diameter D6. While the sixth diameter D6 is generally shown as being larger than the fourth diameter D4 of the body 44 of the filter media 36, in some implementations, the sixth diameter D6 may be substantially similar to (e.g., equal to) the fourth diameter D4. The inner side surface 64 of the seal member 38 may extend between the first end surface 58 and the second end surface 60. In some implementations, the inner side surface 64 extends in an axial direction. In this regard, the inner side surface 64 may define a seven diameter D7 that is less than the sixth diameter D6. The seventh diameter D7 may be substantially similar to (e.g., equal to) the fifth diameter D5 of the filter media 36.

Figure 2:
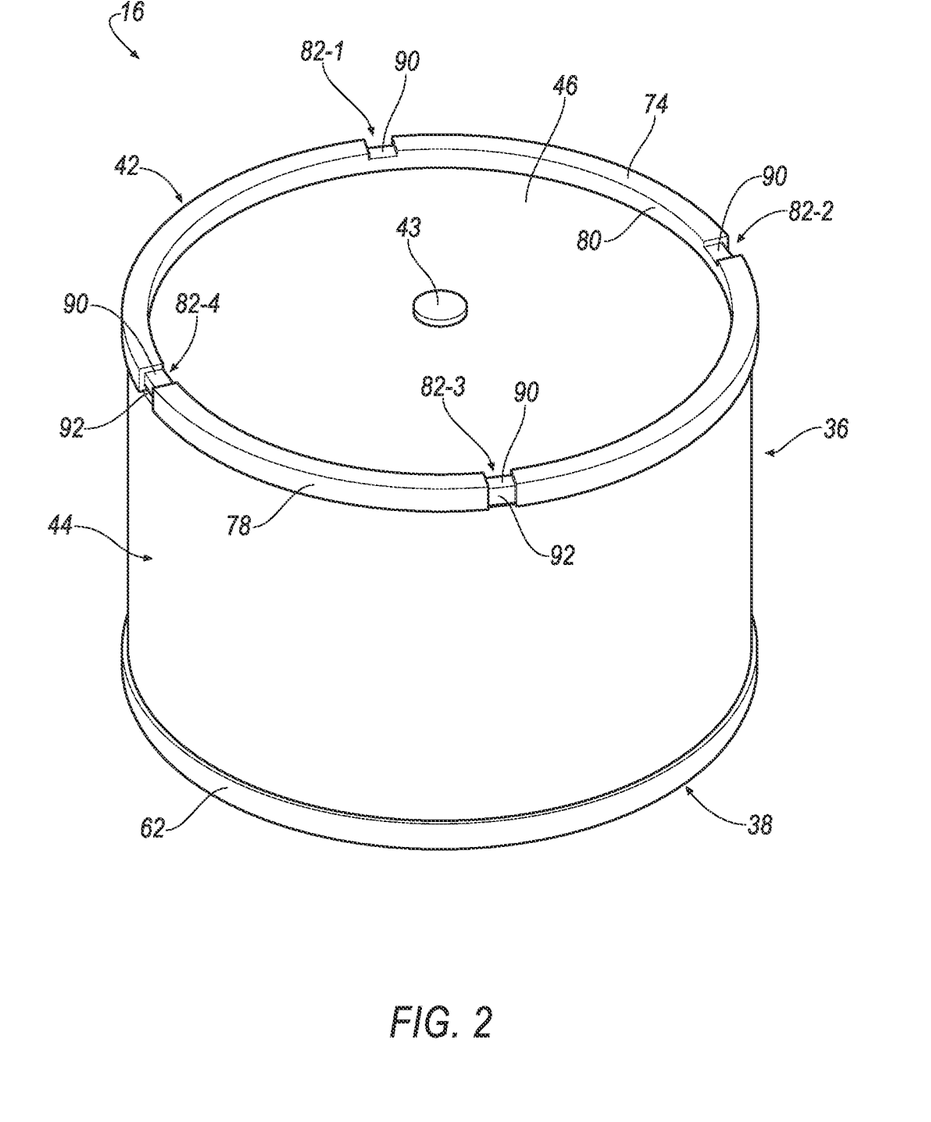
FIG. 2 is a top perspective view of a filter element for use with the filter assembly of FIG. 1.

With continued reference to FIGS. 1, 3, and 4, in the assembled configuration, the seal member 38 may be disposed proximate the second end 48 of the body 44 of the filter media 36. For example, the seal member 38 may be disposed on the ledge 52 such that the seal member 38 surrounds the second end 48 and the longitudinal axis A1. As illustrated in FIGS. 2 and 3, the second end 48 of the body 44 of the filter media 36 may be disposed between the second end surface 60 of the seal member 38 and the first end 46 of the body 44 of the filter media 36, while the outer side surface 50 of the body 44 of the filter media 36 may be flush (e.g., coplanar), or disposed radially outward of, the outer side surface 62 of the seal member 38. In this regard, the second end surface 60 of the seal member 38 may extend proud of the second end 48 of the body 44 of the filter media 36 in the axial direction, while the outer side surface 50 of the body 44 of the filter media 36 may be flush with, or extend proud of, the outer side surface 62 of the seal member 38 in the radial direction. The seal member 38 may be formed of a compressible material, such as rubber or plastic, for example. In some implementations, the seal member 38 is formed of a polyurethane foam.

With reference to FIG. 1, when the filter assembly 10 is in an assembled configuration, the seal member 38 may directly engage the body portion 20 of the housing 18. For example, the seal member 38 may engage one or both of the third support wall 32 or the fourth support wall 34 of the housing 18. In some implementations, the second end surface 60 of the seal member 38 directly engages the third support wall 32 of the housing 18, while the outer side surface 62 of the seal member 38 is spaced apart from the fourth support wall 34 of the housing 18. In other implementations, the second end surface 60 of the seal member 38 directly engages the third support wall 32 of the housing 18, and the outer side surface 62 of the seal member 38 directly engages the fourth support wall 34 of the housing 18. Engagement between the second end surface 60 of the seal member 38 and the third support wall 32 of the housing 18, and/or the outer side surface 62 of the seal member 38 and the fourth support wall 34 of the housing 18, may provide a sealing arrangement that prevents or otherwise inhibits a flow of fluid from the inlet end 12 of the filter assembly 10 to the outlet end 14 of the filter assembly 10 other than through the second end 48 of the filter media 36.

As illustrated in FIG. 4, the screen element 40 may include a base portion 66 and an flange portion 68. The base portion 66 may define a first end 70 and a second end 72. In some implementations, the base portion 66 is substantially disc-shaped such that the first end 70 and/or the second end 72 extend in a substantially planar direction. The base portion 66 may define an eighth diameter D8, that is substantially similar to (e.g., equal to) the fifth diameter D5 of the filter media 36 and the seventh diameter D7 of the seal member 38.

The flange portion 68 may extend from, and surround, the base portion 66. In some implementations, the flange portion 68 extends from the base portion 66 at an angle α. The angle α may be between five degrees and one hundred seventy-five degrees. In some implementations, the angle α is substantially equal (e.g., +/−ten degrees) to one hundred thirty-five degrees. The screen element 40 may be formed of a rigid or semi-rigid material defining a plurality of apertures therethrough. For example, the screen element 40 may be formed from a mesh (e.g., metal, plastic, etc.) defining a plurality of apertures that allow fluid to flow through the base portion 66 in the axial direction relative to the axis A1.

With reference to FIGS. 1, 3, and 4, in an assembled configuration, the screen element 40 is disposed adjacent to the body 44 of the filter media 36. In particular, the first end 70 of the screen element 40 may engage the second end 48 of the body 44 of the filter media 36. As illustrated in FIGS. 1 and 3, in some implementations, the seal member 38 is molded to the body 44 of the filter media 36 and/or the screen element 40. In this regard, the seal member 38 may be overmolded to the screen element 40 such that the seal member 38 encapsulates the flange portion 68, thereby securing the screen element 40 to the body 44 of the filter media 36.

As illustrated in FIG. 4, in some implementations, the compression ring 42 includes a first end surface 74, a second end surface 76, an outer side surface 78, and an inner side surface 80. The second end surface 76 may be spaced apart from and opposing the first end surface 74. In some implementations, the first and second end surfaces 74, 76 extend in a radial direction relative to the axis A1. The outer side surface 78 may extend between the first end surface 74 and the second end surface 76. In some implementations, the outer side surface 78 extends in an axial direction relative to the axis A1. The outer side surface 78 may define a ninth diameter D9 that is substantially similar to, or larger than, the fourth diameter D4 of the filter media 36 and the sixth diameter D6 of the sealing member 38. The inner side surface 80 may extend between the first end surface 74 and the second end surface 76. In some implementations, the inner side surface 80 extends in an axial direction relative to the axis A1. The inner side surface 80 may define a tenth diameter D10 that is less than the ninth diameter D9. The tenth diameter D10 may be substantially similar to (e.g., equal to) the fifth diameter D5 of the filter media 36, the seventh diameter D7 of the sealing member 38, and the eighth diameter D8 of the screen element 40.

As illustrated in FIG. 2, in some implementations, the compression ring 42 includes one or more channels 82-1, 82-2, . . . 82-n. In this regard, while the compression ring 82 is generally shown and described herein as including four channels 82-1, 82-2, . . . 82-n, it will be appreciated that the compression ring 42 may include more or less than four channels 82-1, 82-2, . . . 82-n within the scope of the present disclosure. In some implementations, the channels 82-1, 82-2, . . . 82-n are evenly spaced about the compression ring 42.

The channels 82-1, 82-2, . . . 82-n may be formed in the first end surface 74 and/or the outer side surface 78 of the compression ring 42. The channels 82-1, 82-2, . . . 82-n may extend in a radial and/or axial direction. In this regard, each of the channels 82-1, 82-2, . . . 82-n may be defined in part by an end surface 90 and a side surface 92. The end surface 90 may extend in a radial direction, and the side surface 92 may extend in an axial direction, such that the end surface 90 and the side surface 92 cooperate to define an L-shape. It will be appreciated that the end surface 90 and the side surface 92 may cooperate to define other shapes within the scope of the present disclosure. As will be explained in more detail below, during operation of the filter assembly 10 the channels 82-1, 82-2, . . . 82-n allow fluid communication between the first end 46 and the outer side surface 50 of the body 44 of the filter media 36 and prevent the compression ring 42 from forming a sealed relationship with, or relative to, the housing 18.

With reference to FIGS. 1-3, in the assembled configuration, the compression ring 42 may be disposed about the first end 46 of the body 44 of the filter media 36. In this regard, with reference to FIG. 4, the second end surface 76 of the compression ring 42 may be disposed adjacent to the first end 46 of the body 44 of the filter media 36. In some implementations, the compression ring 42 is molded to the filter media 36. In other implementations, the compression ring 42 may be fastened to the filter media 36 via an adhesive or a snap-fit configuration.

As illustrated in FIGS. 2 and 3, the first end 46 of the body 44 of the filter media 36 may be disposed between the first end surface 74 of the compression ring 42 and the second end 48 of the body 44 of the filter media 36, while the outer side surface 50 of the body 44 of the filter media 36 may be disposed radially inward of the outer side surface 78 of the compression ring 42. In this regard, the first end surface 74 of the compression ring 42 may extend proud of the first end 46 of the body 44 of the filter media 36 in the axial direction, while the outer side surface 78 of the compression ring 42 may extend proud of the outer side surface 50 of the body 44 of the filter media 36 in the radial direction. As illustrated in FIG. 1, in some implementations, the side surface 92 of the compression ring 42 is substantially flush with the outer side surface 50 of the body 44. The compression ring 42 may be formed of a rigid or semi-rigid material, such as plastic or metal, for example. In some implementations, the compression ring 42 is formed from a polyurethane. In particular, the compression ring 42 may be formed from a substantially incompressible material, such that the application of a force in either the radial or axial direction upon the surfaces 74, 76, 78, 80 of the compression ring 42 does not deform the surfaces (e.g., 90, 92) defining the channels 82-1, 82-2, . . . 82-n, or otherwise prevent the flow of fluid through the channels 82-1, 82-2, . . . 82-n during operation of the filter assembly 10.

With reference to FIG. 1, when the filter assembly 10 is in the assembled configuration, the compression ring 42 may directly engage the cover 22 of the housing 18. In particular, the outer side surface 78 of the compression ring 42 may directly engage the second support wall 28 of the housing 18, while the first end surface 74 of the compression ring 42 may directly engage the first support wall 26 of the housing 18. As illustrated in FIGS. 1 and 4, the diameter D4 of the body 44 of the filter media 36 is less than the diameter D1 of housing 18, thereby defining an annular passage 94 disposed within the chamber 24 of the housing 18. In particular, the passage 94 may be disposed between the outer side surface 50 of the filter media 36 and the outer wall 30 of the housing 18.

With reference to FIGS. 2 and 4, the plug 43 may be disposed proximate the first end 46 of the filter media 36. In some implementations, the plug 43 is molded to the first end 46 such that the entirety of the plug 43 is coplanar with, or extends proud of, the first end 46. In particular, the plug 43 may be disposed on the first end 46 such that no portion of the plug is disposed between the first and second ends 46, 48 of the filter media 36. The plug 43 may be formed from one or more of a variety of materials, including plastic, metal, or rubber, for example. In some implementations, the plug 43 and the compression ring 42 are formed from the same material. During operation, the plug 43 prevents fluid from traveling through the center core portion of the filter media 36.

During operation of the filter assembly 10, the channels 82-1, 82-2, ... 82-$n$ of the compression ring 42 may be in fluid communication with the passage 94. In this regard, the channels 82-1, 82-2, ... 82-$n$ may cooperate with the housing 18 to define a fluid pathway 96 from the inlet end 12 of the filter assembly 10 to the passage 94. The fluid pathway 96 may include a radial extending portion 98 and an axial extending portion 100 in fluid communication with the radial extending portion 98. In particular, the end surface 90 of the channels 82-1, 82-2, ... 82-$n$ may be spaced apart from the first support wall 26 of the housing 18, thereby forming the radially extending portion 98 of the fluid pathway 96, while the side surface 92 of the channels 82-1, 82-2, ... 82-$n$ may be spaced apart from the second support wall 28 of the housing 18, thereby forming the axial extending portion 100 of the fluid pathway 96.

During operation of the filter assembly 10, unfiltered fluid enters the filter assembly 10 at the inlet end 12, whereby at least some of the fluid may travel through the fluid pathway 96, formed by the channels 82-1, 82-2, ... 82-$n$ of the compression ring 42 and the first and second support walls 26, 28 of the housing 18, to the passage 94. In this regard, the fluid may travel in a radial direction through the radially extending portion 98 of the fluid pathway 96 and in an axial direction through the axial extending portion 100 of the fluid pathway 96 to the passage 94 prior to flowing through the first end 46 and the second end 48 of the filter media 36.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. A filter assembly, comprising:
   a filter media body including filter media outer side surface extending between a first filter media end surface and a second filter media end surface; and
   a compression ring disposed adjacent to the second filter media end surface and including a first end surface defining a width of the compression ring and an outer ring surface extending from the first end surface and defining a length of the compression ring, the outer ring surface being offset from the filter media outer side surface, the compression ring including one or more fluid channels each defining (i) a first channel portion extending continuously through the entire width of the first end surface from a first end adjacent to and in direct fluid communication with the second filter media end surface and (ii) a second channel portion extending from the first channel portion through the entire length of the outer ring surface to a second end adjacent to and in direct fluid communication with the filter media outer side surface.

2. The filter assembly of claim 1, wherein the compression ring includes a rectangular cross-sectional shape.

3. The filter assembly of claim 1, further comprising a filter housing including a first support wall contacting the first end surface and a second support wall contacting the outer ring surface, the first channel portion forming a first fluid pathway between the first end surface and the first support wall and the second channel portion forming a second fluid pathway between the outer ring surface and the second support wall.

4. The filter assembly of claim 1, wherein each of the one or more fluid channels includes a radial channel portion extending in a radial direction from the first end of the fluid channel and an axial channel portion extending in an axial direction from the first channel portion to the second end of the fluid channel.

5. The filter assembly of claim 1, wherein a first portion of the compression ring is disposed radially inwardly of the filter media outer side surface and a second portion of the compression ring is disposed radially outwardly from the filter media side surface.

6. The filter assembly of claim 1, further comprising a seal disposed adjacent to the first filter media end surface.

7. The filter assembly of claim 6, wherein at least one of the seal and the compression ring is disposed within an annular channel formed between the filter media side surface and one of the first filter media end surface and the second filter media end surface.

8. The filter assembly of claim 1, further comprising a screen element disposed adjacent to the first filter media end surface of the filter media body.

9. A filter assembly, comprising:
   a filter media body including a filter media outer side surface extending between a first filter media end surface and a second filter media end surface; and
   a compression ring disposed between the filter media side surface and the second filter media end surface and including a first end surface defining a width of the compression ring and an outer ring surface extending from the first end surface and defining a length of the compression ring, the outer ring surface offset from the filter media outer side surface of the filter media body, the compression ring defining one or more fluid pathways each defining (i) a first channel portion extending continuously from a first end at the first end surface and in direct fluid communication with the second filter media end surface and (ii) a second channel portion extending continuously from the first portion to a second end in direct fluid communication with the filter media side surface.

10. The filter assembly of claim 9, wherein the compression ring includes a rectangular cross-sectional shape.

11. The filter assembly of claim 9, further comprising a filter housing including a first support wall contacting the first end surface and a second support wall contacting the outer ring surface, the first fluid pathway extending between the first end surface and the first support wall and the second fluid pathway extending between the outer ring surface and the second support wall.

12. The filter assembly of claim 9, wherein each of the one or more fluid pathways is defined by a channel including a first channel portion extending in a radial direction from the first end of the fluid channel and a second channel portion extending in an axial direction from the first channel portion to the second end of the fluid channel.

13. The filter assembly of claim 9, wherein a first portion of the compression ring is disposed radially inwardly of the filter media side surface and a second portion of the compression ring is disposed radially outwardly from the filter media side surface.

14. The filter assembly of claim 9, further comprising a seal disposed adjacent to the first filter media end surface.

15. The filter assembly of claim 14, wherein at least one of the seal and the compression ring is disposed within an annular channel formed between the filter media side surface and one of the first filter media end surface and the second filter media end surface.

16. The filter assembly of claim 9, further comprising a screen element disposed adjacent to the first filter media end surface of the filter media body.

* * * * *